PERSONNEL FLYING DEVICE

Original Filed Nov. 8, 1966 4 Sheets-Sheet 1

INVENTORS.
WENDELL F. MOORE
EDWARD G. GANCZAK
BY
Bean, Brooks, Buckley & Bean
ATTORNEYS

PERSONNEL FLYING DEVICE

Original Filed Nov. 8, 1966

INVENTORS.
WENDELL F. MOORE
EDWARD G. GANCZAK
BY
Bean, Brooks, Buckley & Bean
ATTORNEYS

PERSONNEL FLYING DEVICE

Original Filed Nov. 8, 1966 4 Sheets-Sheet 3

INVENTORS.
WENDELL F. MOORE
EDWARD G. GANCZAK
BY
Bean, Brooks, Buckley & Bean
ATTORNEYS

PERSONNEL FLYING DEVICE

Original Filed Nov. 8, 1966 4 Sheets-Sheet 4

INVENTORS
WENDELL F. MOORE
EDWARD G. GANCZAK
BY
Bean, Brooks, Buckley & Bean
ATTORNEYS

United States Patent Office

Re. 26,756
Reissued Jan. 6, 1970

26,756
PERSONNEL FLYING DEVICE

Wendell F. Moore, Youngstown, and Edward G. Ganczak, Snyder, N.Y., assignors to Bell Aerospace Corporation, Wheatfield, N.Y.

Original No. 3,381,917, dated May 7, 1968, Ser. No. 592,893, Nov. 8, 1966, which is a continuation-in-part of application Ser. No. 530,047, Feb. 25, 1966. Application for reissue Sept. 23, 1968, Ser. No. 765,709

Int. Cl. B64c *39/00, 29/00, 15/02*

U.S. Cl. 244—4 17 Claims

Matter enclosed in heavy brackets [ ] appears in the original patent but forms no part of this reissue specification; matter printed in italics indicates the additions made by reissue.

ABSTRACT OF THE DISCLOSURE

A rigid frame carrying fluid pressure generating means is ridden by an operator and serves to locate and relatively immobilize his torso and legs relative thereto whereas a yoke assembly is pivotally mounted to the frame and provides arm support and locating means for the occupant's body and also is effective, in response to pivoting to control the thrust direction of the device.

This invention relates to devices which are adapted to be individually associated, physically, with a person or persons; and which is then capable of transporting the person or persons and/or other loadings in free flight. More particularly, the invention is directed to such a device in which the lifting and propelling forces are produced by thrust reactions of fluid streams issuing from one or more generally downwardly directed but deflectable nozzles. For example, the invention is concerned with improvements in devices of the type shown in U.S. Patents 3,021,095, 3,111,108, and 3,149,798, and this application is a continuation-in-part of our U.S. patent application Ser. No. 530,047, filed Feb. 25, 1966, now abandoned.

In a man-machine combination of the type herein contemplated, the individual's weight represents a sufficient portion of the total weight of the man-machine combination as to strongly influence the location of the center of gravity (hereinafter referred to as the CG) of the combination. To achieve operational stability, the resultant of the lifting and propelling thrust forces must come reasonably close to passing through the CG at all times. At the same time, control means must be provided for altering the direction of the aforesaid resultant relative to the man-machine combination. These considerations are quite critical inasmuch as control, with stability, must be achieved if the device is to be practicable. In the devices of the aforementioned patents, control and stability are achieved by virtue of the fact that the device is attached and fixed to the man; thus establishing more or less a permanency of the CG location of the combination. Such devices require physical attachment to the man and thus they seriously limit his speed of access to and exit from the device, and thus reduce his overall mobility efficacy. Obviously, when being used for example by fire-fighting, police, or other emergency operative personel, it is a prime desideratum that such equipment be usable with a minimum of operational preparation, and that when a flight is completed the user is unrestrained and instantaneously free to step away from the apparatus. Moreover, since such devices of the prior designs as referred to hereinabove require the individual, when walking about, to support the burden of the weight of the equipment, the flight ranges of such prior devices are limited by the weight of the fuel which the man can reasonably carry when standing or walking, in addition to the tare weight of the equipment.

It is a primary object of the present invention to overcome the aforesaid disadvantages of the prior art devices by providing a combination lift-propulsion device to which the user need not be fixed; but wherein he instead "rides" on the device while having full control thereof in improved manner. The device consists essentially of a body-supporting frame carrying a combination lift-propulsion means which, in combination with the control mechanism serves to establish an approximately constant location of the man with respect to the frame, even though the man rides freely upon the device rather than being attached or fixed thereto while in flight.

In one embodiment of the invention the user stands upright upon a base pedestal as shown in FIGS. 1–4, 8, 9; and the control mechanism comprises a yoke-like device supported by the frame and so positioned that the yoke, and particularly the laterally spaced arm portions thereof, extend into the regions of the user's armpits, thus automatically settling and locating the user in a predetermined position with respect to the device (to thereby predictably locate and fix the CG of the combination) without necessitating that the user be attached to the device. To enhance the locating effect of the yoke, hand grip means are disposed forwardly of the yoke; which means, when grasped, naturally position the yoke arms as aforesaid. Coupled with their locating functions as aforesaid, the yoke and hand grip means are also arranged to be manually movable and connected with the combination lift and propulsion nozzles; and are thus maneuverable to directionally deflect the thrust outputs of the nozzles in the fore and aft plane and/or in the lateral plane, for flight maneuvering control of the device. In this way, the man-frame combination becomes essentialy a functionally integrated mass having a substantially constant CG position, so that the lift-propulsion nozzles may be positioned with respect to the device to produce a thrust vector which always acts approximately through the CG of the device-man mass, and thus operates to provide an inherently stable operating system.

In another embodiment of the invention the frame portion carries a seat as shown in FIGS. 5, 6, 7, into which the user reclines and then grasps hand grip means carried on yoke arms which extend forwardly from the frame structure either under the user's armpits as shown in FIG. 5, or over his shoulders as shown in FIGS. 6, 7. In either case the assemblage is arranged to accommodate the body of the user in such manner as to automatically locate him in the apparatus in proper position so as to attain the inherent stability and maneuvering controllability referred to hereinabove, without requiring the user to be strapped or otherwise fastened therein.

Thus, it is an object of this invention to provide a combination lift-propulsion device for an individual, which is so constructed as to automatically induce (or constrain) the user to maintain himself during controlled flight in such position relative thereto that the thrust vector of the machine will always act approximately through the CG of the system, whereby inherent stability is maintained regardless of the attitude of the system as controlled by the operator.

More specifically, it is an object of this invention to provide a lift-propulsion device as aforesaid in which a frame is utilized to carry the power plant and the fuel supply components as well as the operator; all of which components are so relatively positioned that the CG of the system remains at all times in proper position, without requiring that the user be attached to the machine, or vice versa.

A further object of this invention is to provide a device in accord with the preceding object wherein the combined thrust control and upper torso locating means is in the form of a positionally adjustable yoke and hand-grip combination; the propulsion nozzles being carried by said yoke. Additionally, it is a feature of this invention that the yoke is mounted for movement about a fore-and-aft extending or "roll" axis while the hand-grip means is independently mounted for movement about a transverse or "pitch" axis.

As shown herein, the device includes a pair of downwardly directed lift-propulsion nozzles; the combination thrust vector of which acts approximately through the aforesaid CG. The frame includes means for engaging and supporting the occupant's body at the lower region thereof, either by means of a foot rest or by means of a seat or the like; as well as control means for the nozzles, which control means also act as positioning support means for the upper torso portion of the occupant.

Specifically, the yoke assembly is pivotally mounted on the frame for movements about the fore-and-aft axis, and the hand-grip assembly is pivotally mounted on the yoke for movements about the transverse axis. In this way, control motions induced solely as a result of pivoting of the hand grips about the transverse axis are not transmitted to the yoke assembly. Consequently, minimal movements of the user's body are required to effect control motions of both the yoke and the hand-grip assembly, so that the CG is minimally affected, if at all, as a consequence of these control-inducing body movements.

Other objects and advantages of this invention will appear from the specification hereinafter and the accompanying drawing, wherein.

Figure 2:
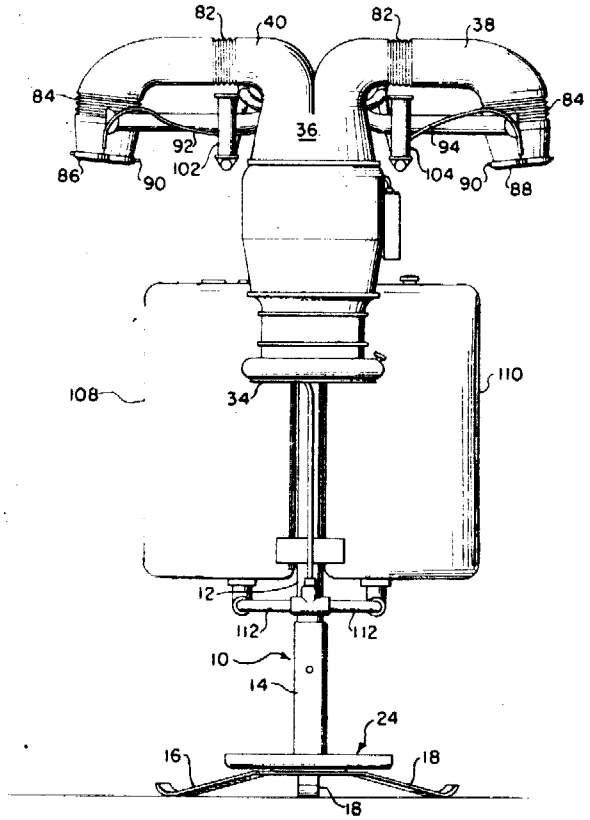
FIG. 2 is a front elevational view of the device of FIG. 1.

By way of one example of an embodiment of the invention, reference is now made more particularly to FIGS. 1–4, inclusive, of the drawing herewith wherein the reference character 10 indicates in general an upright or vertical frame member which consists essentially of a post 12 received at its lower end in a sleeve member 14 and to which the post 12 is rigidly secured. However, the sleeve and post are relatively extensible for a purpose which will be presently apparent. Secured to the lower end of the sleeve is a tripod shaped pedestal assembly including foot members 16, 18 and 20 which are preferably constructed of springy material and are provided with upturned toes 22 providing convenient means for absorbing the shock of landing and for maintaining the frame assembly in upright position when at rest on the ground surface. Immediately above the tripod assembly and secured to the sleeve 14 is a foot rest or platform indicated generally by the reference character 24 and which may be stepped as indicated by the reference character 26 to provide a shoulder or stop against which the heel of a shoe is adapted to be engaged, the purpose for which will be presently apparent.

Figure 1:
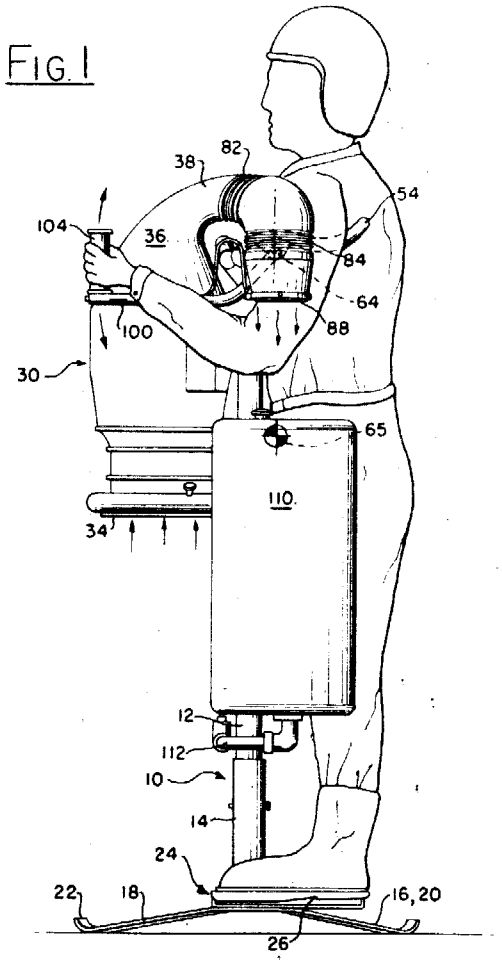
FIG. 1 is a side elevational view showing one form of device according to the present invention, and illustrating the operative position of a user with respect thereto.

It will be noted that the foot platform 24 extends rearwardly from the post 12 or, more particularly, is disposed on the rearward side of the frame 10 so that an operator of the device, as is shown in FIG. 1, stands, while on the platform 24, generally parallel to but rearwardly of the frame assembly 10.

A power plant assembly indicated generally by the reference character 30 is mounted, as by any suitable bracket means (not shown) to the upright post 12 near the upper end of the post 12 so that the power plant 30 assumes essentially the position relative to the post 12 as is shown in FIGS. 1, 2. The power plant 30 as shown in FIGS. 1, 2, comprises a turbine engine assembly having an air intake 34 at its lower end and an exhaust manifold 36 at its upper end; and which power plant is adapted to consume fuel to produce a high volumetric flow of hot exhaust gases discharging through the manifold 36. The manifold 36 is a bifurcated duct assembly having branches 38 and 40 extending therefrom which project laterally and rearwardly relative to the vertical center line of the power plant 30. The power plant 30, on the other hand, will be noted to be disposed forwardly of the upright post or frame so as to be on the opposite side from the operator standing on the platform 24.

Figure 4:
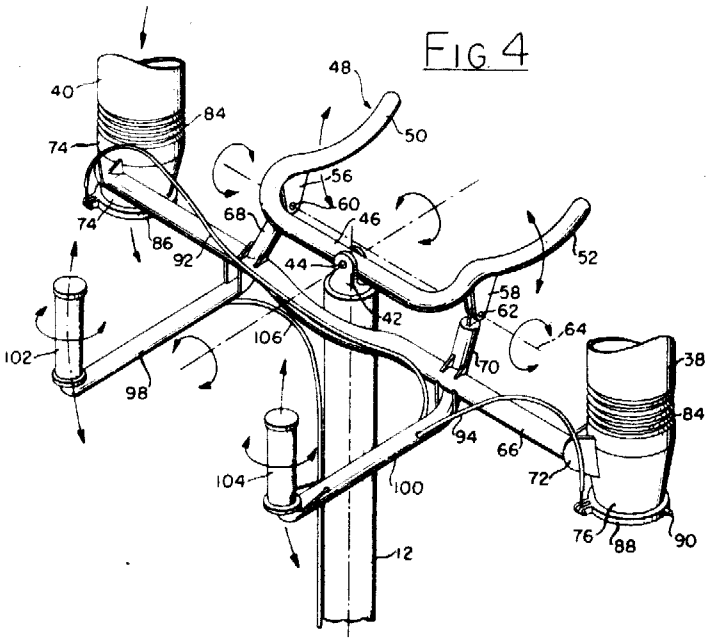
FIG. 4 is a perspective view showing the yoke, frame and nozzle supporting bar assemblages of the device of FIGS. 1–3, and illustrating their relative dispositions and operative interconnections for permitting the requisite relative movements thereof which are necessary for carrying out the principles of the present invention.

As can be best seen in FIG. 4, the upper extremity of the post 12 carries a clevis member 42 mounting a fore and aft extending pivot pin 44 by means of which the central portion of the bight 46 of a U-shaped yoke assembly 48 is pivotally secured for lateral motion about a fore and aft or roll axis relative to the frame member 12. The assembly 48 includes rearwardly trailing arms 50 and 52 which extend generally parallel to the axis defined by the pivot pin 44 and which are spaced laterally apart by an amount sufficient to straddle and just touch the opposite sides of the rib cage of the user.

The arms 50 and 52 are adapted to be disposed in the armpit region of the user, and for that purpose, are disposed at such vertical height above the platform 24 as to comfortably engage under the user's arms, in his armpit area, without discomfort. To this end, the aforementioned adjustment between the post 12 and sleeve 14 may be made to adapt to the individual operator. The trailing rearward ends of the arms 50 and 52 are upwardly turned as indicated by the reference character 54 which tend to cause the operator to assume a fixed and predetermined fore and aft position in his shoulder region. The purpose of this will be presently apparent. Depending ears 56 and 58 provided on the arms 50 and 52 adjacent their juncture with the bight portion 46 carry respective pivot pins 60 and 62 which establish a transverse horizontal axis 64 as indicated in FIG. 4 about which a support arm 66 is adapted to swing. For this purpose, it will be seen that the support arm 66 is provided with upright 68 and 70 which are joined to the respective brackets 56 and 58 by means of the pins 60 and 62. The opposite ends of the support arm 66 are provided with brackets such as that indicated by reference character 72 by means of which the respective thrust nozzles 74 and 76 are fixably attached to the respective opposite ends of the arm 66. The thrust nozzles 74 and 76 are joined to the respective manifold branches 38 and 40 by means of flexible joints as indicated at 82, 84.

Thrust direction deflector means 86 and 88 are mounted for universal movement as by the hinge pins 90, to the lower extremities of each of the thrust nozzles 74 and 76, as shown for example in U.S. Patent 3,021,095, and control cable mechanisms 92 and 94 are connected to such deflectors for relatively oppositely deflecting the exhaust gases in the fore and aft directions so as to impart yaw control to the device, as will be presently apparent. The support bar 66 is provided with a pair of forwardly extending handle grips 102 and 104 which are rotatable for control purposes. The hand grip 102, for example, is connected through a control cable 106 to means for controlling the flow of fuel to the power plant 30 whereas the other hand grip 104 is connected to the two cables 92 and 94 for imparting yaw control to the device.

To complete the assemblage, a pair of generally L-shaped fuel tanks 108 and 110 are mounted on the post 12 about midway up the same, and suitable fuel line means 112 is provided for connection of the fuel supply to the power plant 30. The two tanks may of course be replaced by a single U-shaped tank or the like, thus eliminating the interconnecting tubes.

The relative disposition of the component parts of the device is such as to establish, for a reasonable range of operator weights, a center of gravity position which is disposed fairly close to the vertical center line of the upright post 12 so that the thrust vector of the two nozzles operates along a line which extends substantially through such center of gravity, therefore rendering inherent stabilization to the device. To achieve this center of gravity location, it will be appreciated that the rearward disposition of the foot platform and of the yoke 48 so as to dispose the operator close to but behind the post 12, in conjunction with the forward disposition of the power plant 30, together with the disposition of the fuel tanks 108 and 110 are all important considerations in this respect.

The combination of fuel tanks 108 and 110, together with the yoke assembly 48 and the disposition of the foot platform 24, forms a stall which effectively locates the operator positionally with respect to the frame 10 of the device. The specific structure described above functions to achieve several purposes. First of all, the foot rest which supports the man's body at the lower region thereof automatically locates the man's lower torso and especially his legs with respect to the frame. By "locating" the occupant's torso as used herein is meant that degree of embracement which militates against shifting the center of gravity of the man-machine combination by amounts significant to adversely affect control. An essential feature of this invention is the substantial "locating" of the man's body, while still allowing control to be effected by body movements (i.e., shouder and arm movements).

In combination with the above described means for supporting the man's body and locating his lower torso and legs, an upper torso locating means is employed which also serves (by connection to the propulsion nozzles) to achieve directional control of the vector of thrust produced by the nozzles. In this way, the man's body and the machine frame become essentially a functionally single mass.

The upper torso locating means incorporates two interacting entities comprising the upper arm-engaging yoke and the hand grip means. The yoke serves to laterally contain the upper torso while the yoke-hand-grip combination serves to position the upper torso in the fore and aft plane. Similarly, the foot platform step 26 serves to assist in positioning the man's body in the fore and aft plane. Next, the power plant and fuel supply components are so positioned on the frame as to cooperate in locating the center of gravity of the man-machine combination within a generally centrallized fore and aft plane and at a height and fore and aft position, as indicated by the reference character CG in FIG. 1, that lies below the propulsion nozzles and substantially through which the thrust vector produced by the nozzle acts.

Figure 5:
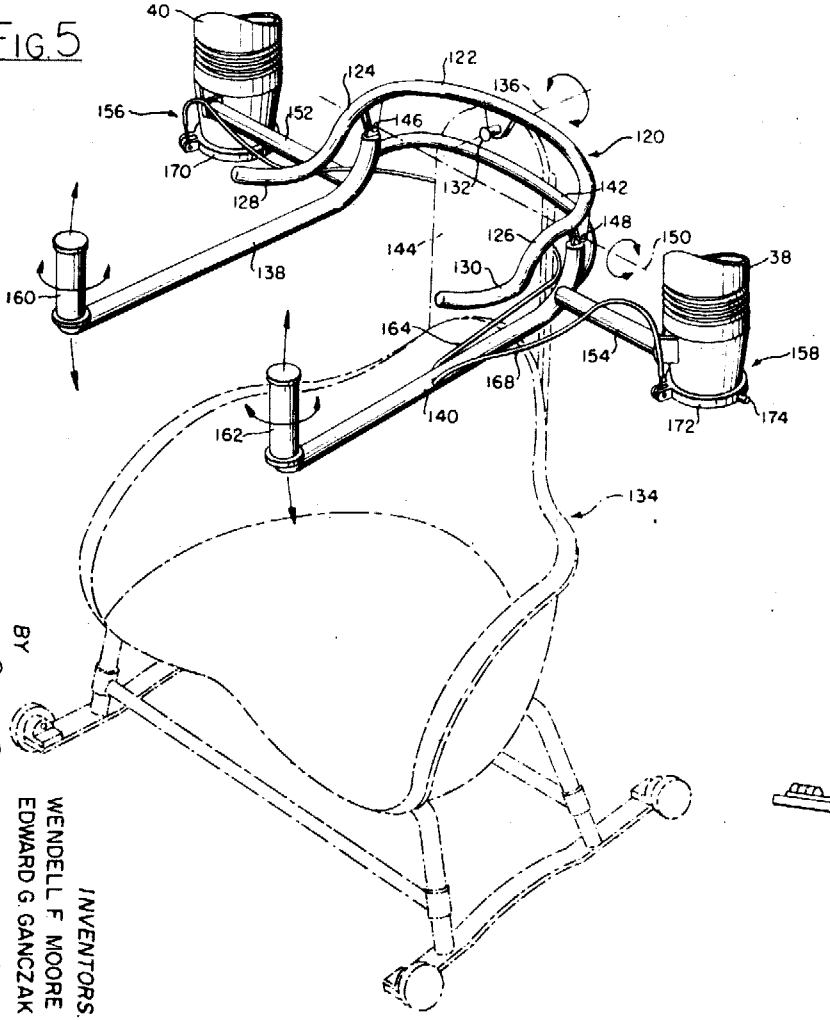
FIG. 5 is a view similar to FIG. 4 but showing a modified form of construction in accordance with the invention.

With reference now to FIG. 5, the system as shown therein adapted to accommodate an operator in seated position rather than in the standing position as has been described above in conjunction with FIGS. 1–4. FIG. 5 corresponds generally to FIG. 4 in that it shows the control mechanism for the modified form of the device as above. As shown, the yoke assembly is indicated generally by the reference character 120 and will be seen to include a bight portion 122 and a pair of forwardly extending arms 124 and 126, such arms being adapted to fairly closely embrace the opposite sides of the user's chest and to project beneath his arms so that the cradle-like forward end portions 128 and 130 engage the user's armpits and serve to locate him in the fore-and-aft plane insofar as his upper torso is concerned. Thus, the FIG. 5 configuration, unlike the FIG. 4 configuration, has the bight or cross bar portion extending behind the operator but in each case, the fore-and-aft extending arm portions of the yoke assembly straddle the user's chest and maintain the upper torso of the operator laterally constrained whereas the cradle-like terminal end portions of the yoke arms in each case tend to maintain the upper torso located in the fore-and-aft plane. The yoke assembly of FIG. 5 is pivotally mounted as by the pin 132 upon the seat structure which is indicated generally by the reference character 134, so that by the yoke assembly is free to pivot about the fore-and-aft axis 136 substantially as is shown and in common with the yoke assembly illustrated in FIG. 4.

The hand grip assembly according to the configuration shown in FIG. 5 includes the forwardly extending generally horizontal members 138 and 140 rigidly joined together by the cross brace member 142 which extends behind the back portion 144 of the seat assembly 134. The back portion 144 of the seat structure corresponds to the post 12 of FIGS. 1–4. The members 138 and 140 are pivotally joined to the yoke assembly 120 by means of pivot pins 146 and 148 to establish a transverse pivot axis 150 about which the hand grip assembly is pivotally attached to the yoke assembly 120. Stays or braces 152 and 154 are connected to respective members 138 and 140 and rigidly carry at their outer ends the propulsion nozzle assemblies 156 and 158. The hand grips 160 and 162 serve not only to locate the user's armpits naturally within the cradle portions 128 and 130, but also, as before with respect to FIG. 4, the hand grip 160 is connected by suitable control means to the power plant or gas generator control mechanism for obtaining a greater or lesser degree of gas generation for expulsion through the nozzles 156 and 158. The other hand grip 162 is connected by means of suitable cable devices 164 and 168 to the deflectors 170 and 172 each of which is pivotally connected to a respective nozzle, as for example by the pivot pins one of which is shown at 174 so that the deflectors 170 and 172 are relatively oppositely pivoted to deflect the gases emanating from the nozzles 156 and 158 in relatively opposite fore-and-aft directions for imparting yaw control to the device.

Thus, from FIG. 5, it will be apparent that the control assembly illustrated therein operates essentially on the same principles as does the control system shown in FIG. 4. Moreover, the cooperative relationship between the control assembly and the frame is the same in each case. That is to say, whereas in FIG. 4 the frame includes a foot rest upon which the operator stands so as to position his lower torso, the assembly according to FIG. 5 incorporates the seat structure 134 which operates to receive and substantially immobilize positionally the lower torso of the operator. In each case, the yoke assembly serves not only to laterally constrain and position the upper torso of the user in the lateral plane by virtue of the constraining action afforded by the fore-and-aft extending arms 124 and 126, but the cradle-like terminal end portions of these arms serve to constrain and position the upper torso in the fore-and-aft plane. This latter effect is of course, in each case, enhanced by the utilization of the hand grip assembly which naturally serves to maintain the user's armpits properly located within and engaged by the cradle-like portions 128 and 130. At the same time, in each case, the pivot axis established between the yoke assembly 120 and the frame is contained within a vertical fore-and-aft extending plane which contains the center of gravity for the system.

Body movements controlling the propulsion nozzle assembly about the axis 136 in each case is occasioned by lifting one shoulder while dropping the other, and vice versa; this motion also being imparted to the hand grip assembly. These body movements do not, however, materially affect the location of the center of gravity of the man-machine combination. Motions of the hand grip assembly, on the other hand, are entirely independent of the yoke assembly in each case, being about transverse axes which intersect the propulsion nozzles carried by the hand grip assembly. In this way, there is a minimal shift of the propulsion nozzles, and this action serves to preserve the relationship of the thrust vector passing substantially through the center of gravity of the system. Moreover, the independent motion of the hand grip assembly in each case preserves the substantially immobilized position of the upper torso of the user which might otherwise adversely affect the location of the center of gravity of the system causing instability and oscillations deleterious to the operation of the device.

Figure 3:
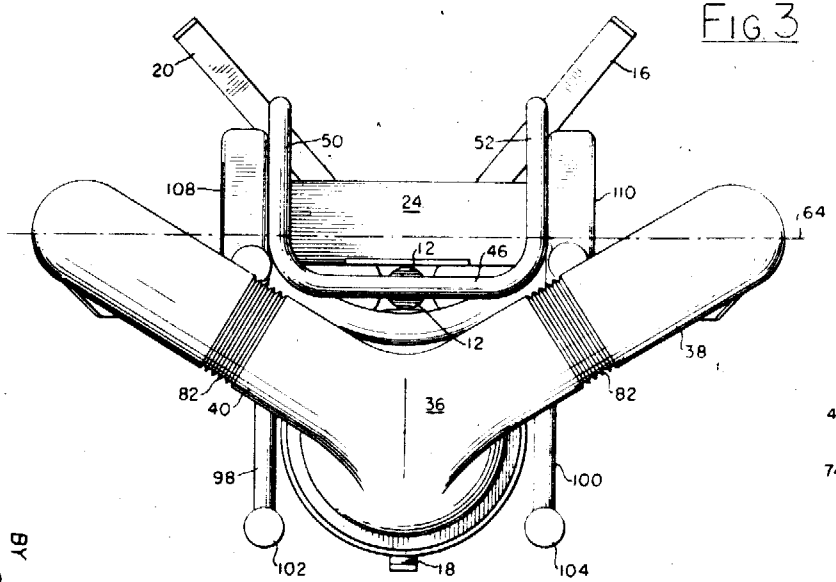
FIG. 3 is a top plan view, on enlarged scale, of the device shown in FIGS. 1 and 2.

The location of the pivot axis for the hand grip assemblies in each case can be better appreciated from a study of FIGS. 1, 3 and 4. The principles of operation as shown therein apply in either case; that is, either in connection with the structures of FIG. 4 or FIG. 5. In FIG. 1, it will be seen that the transverse axis 64 about which the hand grip assembly pivots is directly above the CG, as indicated by the vertical line 65, and it will also be seen that the propulsion nozzles are substantially at the height of the axis 64. This is further illustrated in FIGS. 3, 4. The same arrangement is provided in either case.

Figure 6:
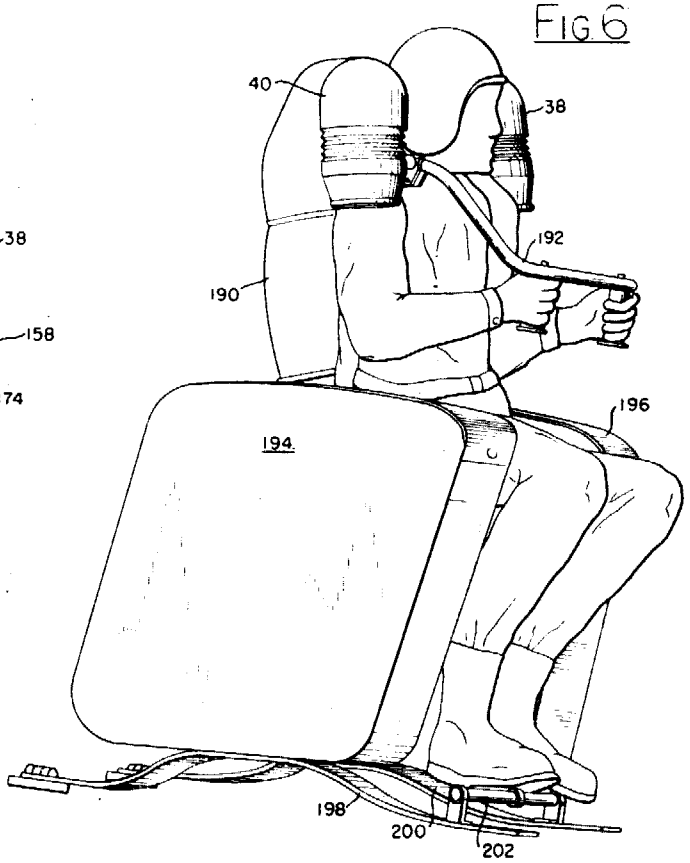
FIG. 6 is a perspective view showing a device in flight utilizing a control assembly modification similar to that shown in FIG. 5.

Carrying forward the principles of operation according to the modification illustrated in FIG. 5, reference is had at this time more particularly to FIG. 6. In this figure, the gas generator is a turbine assembly indicated by the reference character 190 and in the particular instance shown, instead of there being two bar members mounting the hand grips there is but a single member 192 for this purpose which carries both hand grips, substantially as is shown. Otherwise, the principle of operation is identical with the control arrangement of FIG. 5. In FIG. 6, the chair or seat assembly is formed wholly or in part by fuel tanks such as those indicated by the reference characters 194 and 196. That is to say, the entire seat structure may, if desired, be of hollow configuration for housing a suitable quantity of fuel for operation of the turbine 190. The base of the frame preferably carries resilient landing runners 198 and 200 which as shown, preferably include a foot rest 202.

Figure 7:
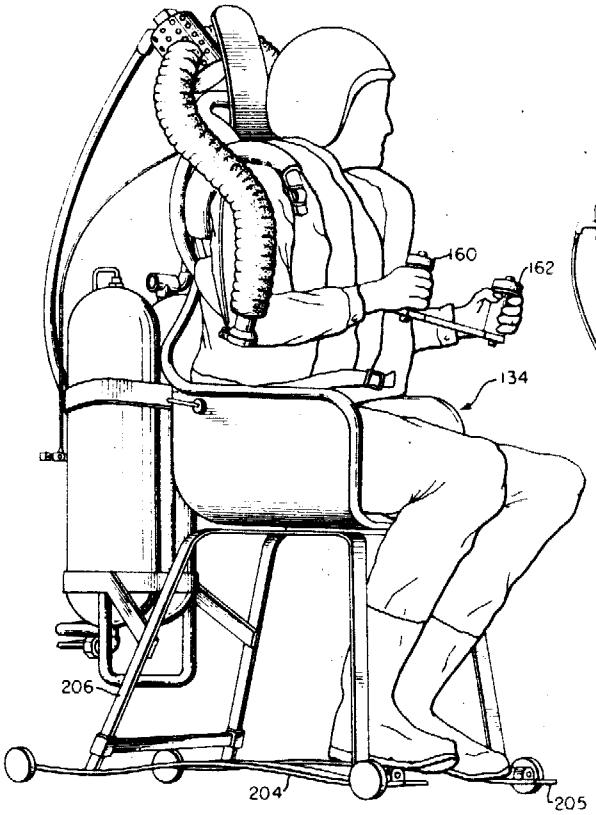
FIG. 7 is a view similar to FIG. 6 but showing still another form of the device which also employs a control system similar to that of FIG. 5.

A similar arrangement is shown in FIG. 7 except, in this instance, the chair or seat 134 is that indicated in phantom lines in FIG. 5. The base of the frame includes the landing runners 204 and 205 which also may carry wheels as shown and which runners are connected by suitable braces or struts 206 to the base of the seat 134. The system shown in FIG. 7 is a hydrogen peroxide unit, the details of which are disclosed in the previously mentioned Patent No. 3,021,095.

Figure 8:
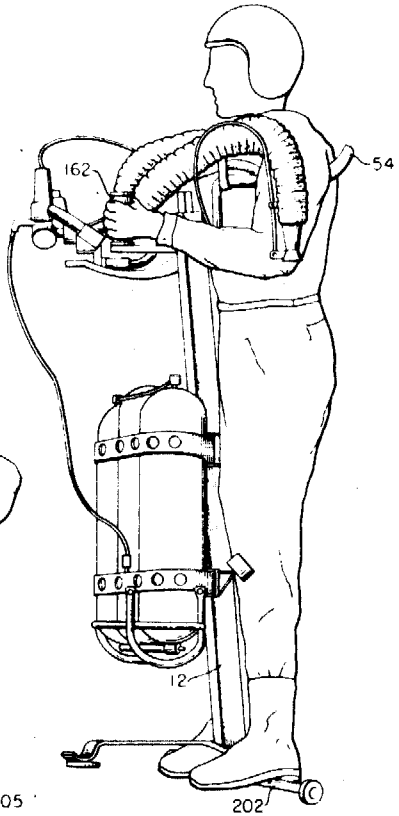
FIG. 8 is a view similar to FIG. 1 but showing a form of the invention employing a modified form of power plant and control arrangement.

The system shown in FIG. 8 is identical in principle with the construction shown in FIGURES 1–4 except, in this instance, the hydrogen peroxide unit is also used, as is the case with FIG. 7. As is the case with FIG. 7, the FIG. 8 hydrogen peroxide system is disclosed in Patent No. 3,021,095. Otherwise, in all cases, the principles of operation enumerated with respect to FIGS. 4 and 5 and which are identical except for specific structural arrangements, are utilized in all forms of the invention shown herein.

Figure 9:
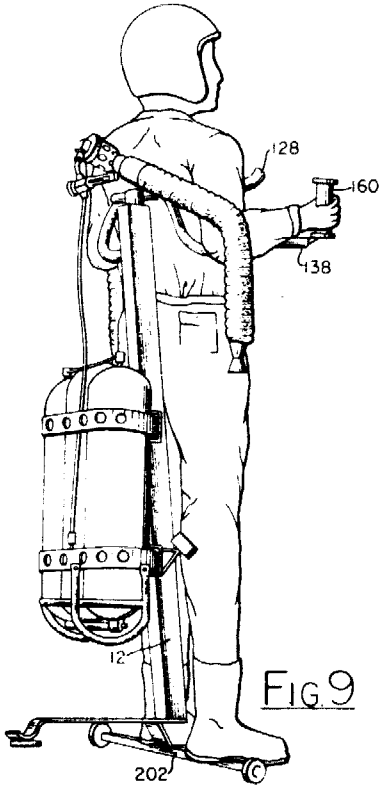
FIG. 9 is a view similar to FIG. 8 but illustrates still another form of power plant and control arrangement.

The system shown in FIG. 9 is identical in principle with the device of FIG. 8, except that in the case of FIG. 9, the frame post 12 is located behind the machine occupant while the yoke arms 138–140 extend alongside the rib cage of the machine occupant when standing on the base platform which extends forwardly of the frame post 12. Hence, the occupant may quickly and easily assume a proper operative position within the device by simply "backing-up" into the device and simultaneously hooking his arms onto the members 128–130 while stepping backwards onto the foot platform 202, and then grasping the machine control hand grips 160, 162. He is thereupon automatically properly located in the machine for inherent stability and optimum maneuvering control purposes, as explained hereinabove. Also, it will be appreciated that upon completion of the flight operation the occupant is totally unrestrained and may literally leap out of and away from the machine upon arrival at destination, without being required to unstrap or unlatch or otherwise disconnect himself from the apparatus.

Hence, in every case the user rides on the device and is carried thereby in such fashion that he derives support by engaging his lower torso upon the device with the arrangement being such that this support properly positions the lower torso of the user with respect to the frame. The control assembly in each case properly positions the upper torso of the user with respect to the frame so that all of the advantages enumerated hereinabove are attained thereby. With all of these arrangements, the operator is not actually attached to the device, but rather rides thereupon so that he may quickly mount and dismount with respect thereto, it being of vital importance to establish independence of control movements of the hand grip assembly with respect to the yoke assembly. In this way, all control motions may be effected without making any material shift in the position of the center of gravity of the man-machine combination, thereby rendering control practicable and stable.

Otherwise stated, this invention contemplates provision of a device which consists essentially of a vertically extending chassis or frame having a foot platform or a seat at the lower end thereof acting both to support a man on the device and to properly locate his lower torso and legs with respect to the frame. At the upper end of the frame there is provided a control assembly which also acts to properly position the man's upper torso; the control assembly including a pivotally mounted yoke located at such a height above the foot platform or seat that the user will be accommodated therein and thereby positioned so that the yoke, and particularly the laterally spaced arm portions thereof, extend into positions straddling the rib cage in the region of the user's armpits, thereby enabling the user to be supported by the frame while engaging the arm portions of the yoke within the area of his armpits. Hand grip means are pivotally connected to the yoke and provide means for controlling the throttle, the fore-and-aft motion control of the device, and the yaw control, both in direction and magnitude. Lateral control is achieved by operator motions of the yoke parts which are engaged beneath the arms of the operator.

In the versions illustrated by way of example herewith, the hand grips are disposed forwardly of the yoke. In other versions, the hand controls may for example be disposed downwardly from the yoke; terminating at positions adjacent the man's hips, whereby the operator's arms will remain at his side when operating the device.

In any case, the man-device combination becomes essentially a single functional mass, so that the propulsion nozzles are so positioned with respect to the device that the nozzles produce at all times thrust vectors acting approximately through the center of gravity of the man-machine system.

It will of course be appreciated that whereas only a few forms of the invention have been illustrated and described herein by way of example, various modifications of the invention as illustrated and described herein may be made without departing from the spirit of the invention or the scope of the following claims. For example, as shown herein the devices of the invention are adapted to accommodate only a single person; whereas it will of course be apparent that such a machine may be constructed to accommodate any number of persons and/or other loadings in tandem or side-by-side seated or standing arrangements. In such cases the control arrangements may or may not be provided for dual controllability, as preferred. Also, instead of the use of two reaction nozzles as shown and described herein, one or any other number of nozzles deriving thrust from one or more fluid thrust generating sources may be employed.

We claim:

1. An omnidirectionally mobile personnel flying machine comprising, in combination, a vertically elongate frame, fluid pressure generator means carried by said frame, reaction thrust producing nozzle means carried by said frame for deflections relative thereto within fore-and-aft and lateral planes, said nozzle means being connected to said fluid pressure generator means, and means for partially embracing and supporting a user's body on said frame in positional relation with respect thereto so that the center of gravity of the man-machine combination remains approximately positionally fixed with respect to the frame, said means comprising in combination, a lower body rest means constituting an integral portion of said frame which is rigid therewith for supporting and substantially immobilizing the lower torso and legs of a user's body, and upper torso guide means carried by said frame above said lower body rest means for locating the upper body portion of the user with respect to said frame, said upper body guide means being movable relative to said frame to effect the aforesaid nozzle means deflections.

2. A machine as set forth in claim 1 wherein said means for supporting a user's body so locates the body that the center of gravity of the man-machine combination is located approximately in line with the thrust direction vector of said nozzle means and below the level of discharge thereof.

3. The device according to claim 1 wherein said upper torso locating means comprises a yoke pivotally connected to said frame about a fore-and aft axis and including a pair of spaced, generally horizontal members adapted to straddle a man's rib cage and engage beneath his arms, and a hand grip assembly pivotally mounted on said yoke about a transverse axis, said nozzle means being connected for movement with said hand grip assembly.

4. The device according to claim 3 wherein said nozzle means comprises a plurality of nozzles located symmetrically relative to said fore-and-aft axis and at a level for intersection by extensions and said transverse axis.

5. The device according to claim 4 wherein said lower body rest means comprises a foot platform.

6. The device according to claim 4 wherein said lower body rest means comprises a seat.

7. The device according to claim 1 wherein said lower body rest means comprises a foot platform and said upper torso locating means comprises a yoke and a hand grip assembly, said yoke being pivotally connected to said frame about a fore-and-aft axis and said hand grip assembly being carried by and pivoted about a transverse axis to said yoke for movement about such transverse axis independently of yoke movement, and said nozzle means being connected to said hand grip assembly for movements therewith.

8. The device according to claim 1 wherein said lower body rest means comprises a seat and said upper torso locating means comprises a yoke and a hand grip assembly, said yoke being pivotally connected to said frame about a fore-and-aft axis and said hand grip assembly being carried by and pivoted about a transverse axis to said yoke for movement about such transverse axis independently of yoke movement, and said nozzle means being connected to said hand grip assembly for movements therewith.

9. An omnidirectionally mobile personnel flying machine comprising, a frame structure shaped to partially encompass the body of an occupant, said frame structure including a body support base portion and a frame portion extending upwardly from said base portion, armpit engaging means pivotally mounted upon said frame portion only about a fore-and-aft axis relative thereto and extending therefrom alongside of the machine occupant, hand grip means pivotally mounted on said armpit engaging means only about a transverse axis relative to the armpit engaging means, fluid pressure generating means carried by said frame structure, machine lift and directional propulsion means carried by said frame structure including fluid discharging reaction-thrust producing nozzle means supplied by said generating means and connected to said hand grip means and movable therewith so as to adjust the direction of the thrust output of the nozzle means in a fore-and-aft plane and in a transverse plane, and including means for adjusting the direction and magnitude of the thrust output thereof, and being so located that the composite thrust vector of said nozzle means acts at all times approximately through the center of gravity of the machine-load combination, control means for adjusting the magnitude and direction of the thrust output of said nozzle means thereby to regulate the machine lift and directional propulsion effects of said nozzle means.

10. A machine as set forth in claim 9 wherein said machine lift and propulsion means comprises a pair of reaction-producing nozzle disposed at opposite sides of the machine, said nozzles being collectively and differentially adjustable by said control means for selective regulation of the magnitude and direction of the net thrust effects of said nozzle means.

11. A machine as set forth in claim 9 wherein said [arm support] *hand grip* means comprises a pair of arm support members extending along opposite sides of the machine occupant.

12. A machine as set forth in claim [10] *11* wherein said control means comprises a pair of rotatable hand grips each mounted on one of said arm support members and separately operable to vary the direction of the thrust effects of said nozzles and the thrust output magnitudes thereof.

13. The machine as set forth in claim 11 where [each of] said [arm support members] *armpit engaging means* includes an armpit cradle portion.

14. A machine as set forth in claim 13 wherein said [arm support members each comprises a forwardly extending hand grip support portion and a rearwardly extending armpit cradle support portion] *hand grip means extends forwardly of said frame portion and said armpit cradle portions extend rearwardly of said frame portion.*

15. A machine as set forth in claim 13 wherein said armpit cradle *portions* and said hand grip *means* [support portions] each extend forwardly of said frame portion.

16. A machine as set forth in claim 9 wherein said frame structure includes a seat device extending from said frame structure to accommodate in seated position thereon the machine occupant.

17. An omnidirectionally mobile personnel flying machine comprising, in combination, a chair structure having a seat portion and a vertically elongate rigid back integral therewith whereby a user and especially his lower torso and upper legs are substantially immobilized while in flight so that the center of gravity of the man-machine combination remains approximately positionally fixed with respect to the seat structure during flight, a yoke assembly pivotally attached to the upper portion of said chair back, said yoke assembly comprising an integral bar having a bight portion and a pair of forwardly extending arms, said arms being adapted to straddle a user's rib cage and having cradle-like portions to engage a user's armpits, hand grip means having a rearward portion pivotally attached to said yoke assembly, a forwardly projecting portion, fluid pressure generator means carried by said seat, nozzle means connected to said hand grip means for movements therewith, said nozzle means being positioned above said center of gravity of the man-machine combination and directed to produce a resultant thrust vector substantially passing through said center of gravity, and flexible conduit means connecting said nozzle means to said fluid pressure generator means, said bight portion of the yoke assembly being pivotally attached to said chair back about a fore-and-aft axis whereby shoulder-influenced motions of said yoke assembly impart, through said hand grip means, deflections of said nozzle means thrust vector in a transverse plane, said forwardly projecting portion of the hand grip means having a hand grip device thereon and said rearward portion being pivotally attached to said yoke assembly about a transverse axis whereby arm-induced pivotal motion of said hand grip means directly imparts deflection of said nozzle means thrust vector in a fore-and-aft plane.

References Cited

The following references, cited by the Examiner, are of record in the patented file of this patent or the original patent.

UNITED STATES PATENTS

| | | | |
|---|---|---|---|
| 2,943,816 | 7/1960 | Hiller | 244—23 |
| 3,243,144 | 3/1966 | Hulbert | 244—4 |

MILTON BUCHLER, Primary Examiner

THOMAS W. BUCKMAN, Assistant Examiner

U.S. Cl. X.R.

180—1.6